Dec. 21, 1965     T. S. JESS ETAL     3,224,571
COMPARTMENT MIXING PACKAGE
Filed Nov. 19, 1962
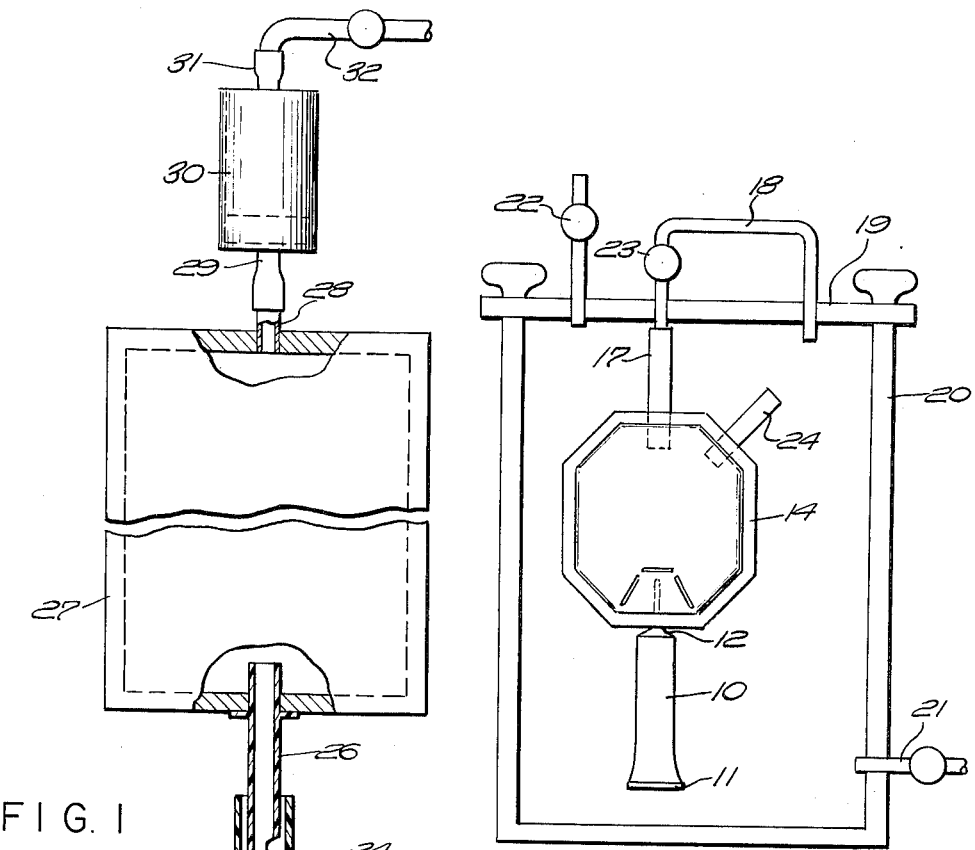
FIG. 1
FIG. 2
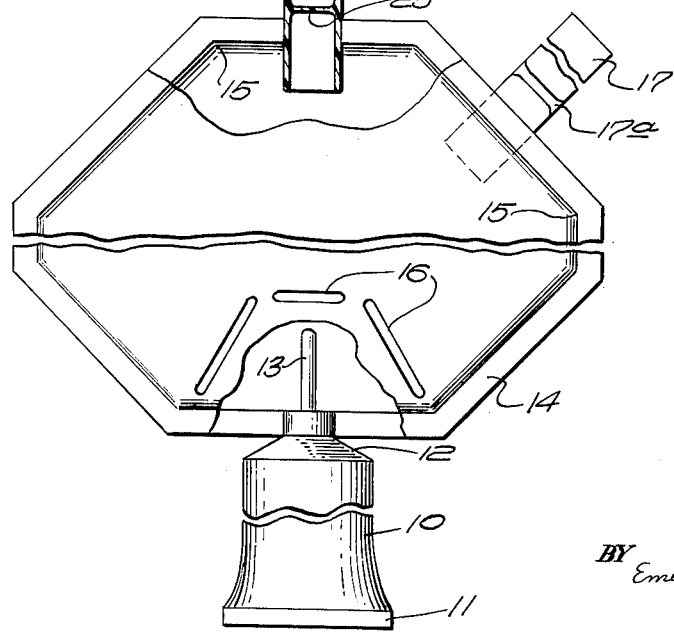
INVENTORS
THURMAN S. JESS
MILTON J. MORRISETTE
EDWARD J. POITRAS
BY Emery, Booth, Miller & Townsend
ATTORNEYS

United States Patent Office 3,224,571
Patented Dec. 21, 1965

3,224,571
COMPARTMENT MIXING PACKAGE
Thurman S. Jess, Holliston, Milton J. Morrisette, Ashland, and Edward J. Poitras, Holliston, Mass., assignors to Fenwal, Incorporated, Ashland, Mass., a corporation of Massachusetts
Filed Nov. 19, 1962, Ser. No. 238,411
3 Claims. (Cl. 206—47)

This application is a continuation-in-part of our prior copending application Serial No. 45,084, filed July 25, 1960, now United States Patent No. 3,064,802, issued November 20, 1962.

This invention relates to a method of encapsulating, to apparatus including an epoxy resin kit for carrying out the method, and to method and apparatus for readying the kit for such use.

The invention will be understood from the following description taken in conjunction with the accompanying drawing in which:

FIG. 1 shows the encapsulating assembly; and

FIG. 2 shows the apparatus for readying the resin kit for use.

In our above identified copending application we more fully disclose the epoxy resin and curing agent or similar compound mixture substance kit shown in the instant drawing to comprise a closed collapsible tube 10 of a material which will contain or provide a chamber for the curing agents, including the toxic or caustic ones, indefinitely and at all practical temperatures, without being attacked chemically. The curing agent packaging means or tube 20 may be metal, for example tin, or for added strength an alloy of tin and copper, or, and depending on the curing agent, it may be plastic, as polyethylene, also polypropylene.

The curing agent storing tube 1 is comprised of a generally elongate, soft or flexible and collapsible body portion merging at one end with a relatively stiff shoulder 12 tapering to a reduced neck. The neck is reduced at its outer end by an annulus or step from which integrally depends or projects a generally solid straight stem or tip 13 which may be formed by the same impact extrusion or molding as the remainder of the tube 1, and so as to hermetically seal the dispensing end of the tube against any leakage thereat of the curing agent or other tube content. The tip 13 is seen to project sufficiently for ready grasping between and bending by the fingers, whereupon by manually flexing a few times and through a relatively small angle the tip is broken or torn free of or away from the tube leaving in that a dispensing opening.

In manufacture the tube 1 is charged with the curing agent or other mixing or combining component or ingredient through its other and initially open end. Since some of the curing agents at least are highly "wetting" and of low viscosity, it is necessary that a positive or forcible closing or sealing be effected at the free or filling end of the tube 1. A tube of the herein specified tin or tin and copper alloy composition meets such requirement in that it may readily be flattened and folded or pressed so as to force the filled ingredient from between its folds. The tube end 11 may then be hermetically sealed by dipping into or otherwise contacting with solder or the like fusing or adhering agent, which is selected to be molten or flowable at a temperature below that at which the curing agent would be affected.

The kit or packaging means further comprises a pack or pouch for another ingredient of the compound mixture substance, such as the resin of the activating adhesive. For such resin at least the pouch is desirably formed of tough flexible light weight sheet material such as a polyvinyl or similar synthetic plastic. Since for some applications it is required to exhaust or exclude air from the kit, the pouch is conveniently made completely collapsible or lay flat, as herein by fabricating as an envelope or from mating juxtaposed sheets, which sheets are hermetically sealed by bonding or fusing together along their common peripheral margins 14.

Further, the pouch has a round, hexagonal or similar shape or configuration whereby the interior angles at its apices 15 are as wide as possible and in any case substantially more than 90 degrees. By thus eliminating sharp corners from the resin pouch the trapping of the resin as formerly in right angle corners is prevented, while also the mixing of the resin with the curing agent is facilitated, and the combining more generally of these or other mixture ingredients is made more complete, accurate, and uniform.

The tube and pouch are integrally joined by inserting and sealing the neck of the tube 10 between the pouch sheets at the margin 14, and the pouch is semi-partitioned by interrupted seal lines 16 to define a small cage or trap for the tube tip 13 when broken off. The openings left intervening between the line 16 at which the juxtaposed pouch sheets are flattened and sealed will be understood to be small enough to prevent escape of the tube tip yet large enough for easy passage therethrough of the ingredient from the tube for combining with the ingredient of and in the much larger body of the pouch.

This invention provides method and apparatus employing the described kit for encapsulating or "potting" such objects as an electronic component or assembly.

It will be understood that in such encapsulating and for like applications it is desired to fill the assembly housing solidly, with no voids. This requires of course that no air be introduced into the housing space from the invention kit, along with the supplying thereto of the adhesive on the like.

To that end the kit may under the invention and following charging of the pouch with the resin be evacuated as shown in FIG. 2. More particularly, the kit is coupled as by a port tube 17 to a U-tube 18 passed reversely through the removable cover 19 of a vacuum chamber 20, the latter having also an evacuating line 21 and a venting line 22. The U-tube 18 is seen also to have a restriction or valve 23 by which it may be assured that a higher degree of vacuum is maintained in the vacuum chamber 20 than in the adhesive pouch, so that there is no possibility of unwanted compression of the pack such as might force or expell the contained resin up into the connecting tube.

In the operation of the FIG. 2 apparatus for degassing of the adhesive kit, the kit is first pressed on to the tube 18 by its port tube 17 as shown, and the vent 22 and shut-off valve 23 are closed. The chamber 20 is then evacuated by applying line 21 to a vacuum source until the desired degree of vacuum has been attained, the exhausting of the pouch being controlled by manipulation of the valve 23. Following that vacuum line 21 is closed off, the pouch valve 23 is shut off, the vent valve 22 is opened, and the cover 19 is removed. Finally the evacuating port 17 is closed, as by clamping or heat sealing as at 17a, FIG. 1.

There is thus produced a pack from which, within desired or controlled limits, all gas or vapor has been excluded.

The kit has a dispensing outlet comprising a length of plastic tubing 24 sealed at one end through the pouch wall closed by a puncturable membrane or diaphragm 25, whereby the pouch may be opened for dispensing of the adhesive by insertion past the membrane 25 of the point of a stiff coupler 26 received through one end of a rigid chamber 27 such as employed for housing the electronic assembly to be encapsulated.

The housing 27 mounts at its other end a port tube 28 by which it may be coupled to a vacuum line 32 through a non-collapsible plastic or other transparent sight chamber 30 from which oppositely project tubing lengths 29, 31 by which it may be coupled to said port tube 28 and vacuum line 32 respectively.

To mix the active ingredients in the field on short notice, without measuring, in any and just the desired quantities, and so without the waste of an excess which cannot be used within the "pot life" of the activated resin, the user needs simply engage tip 13 through the walls of the bag and flex or stress it in one and the opposite direction a few times to break it off. The tube 10 may then be squeezed, and more particularly its body collapsed and rolled up at the end 11, to express all its measured quantity of curing agent to the pouch. The ingredients are then mixed by kneading of the pouch to a uniform consistency of the resulting adhesive.

For the encapsulating the pouch outlet 24 is then applied to coupler 26 to puncture diaphragm 25 and open the pouch to housing 27, in which a vacuum is then drawn by opening line 32.

In accordance with the invention, the filling is allowed to proceed to overflowing of the housing 27 up into the transparent chamber 30. Upon observing or detecting visually this overfilling against gravity it is confirmed that the encapsulating is completed.

We claim:

1. A kit for packaging compound substances comprising a closed collapsible bag of a flexible material compatible with one ingredient of a compound substance, a measured quantity of that one ingredient sealed in the bag, a closed collapsible tube having an outlet and being of a material compatible with another ingredient of the substance, a measured quantity of that other ingredient sealed in the tube, a generally solid tip closing said tube outlet, said tip projecting sufficiently for grasping by the fingers and adapted to be broken away by manual flexing, the tube mounted with said outlet in closed communication with said bag and with said tip engageable through a flexible collapsible wall of said kit, said tube adapted upon the breaking away of said tip to be manually manipulated to express said other ingredient through said outlet and into said bag, a dispensing port tube outlet opening into said bag and adapted to receive rigid coupler means, and a membrane integrally closing said port tube and constructed and arranged to be opened by said rigid coupler means upon its said reception in the tube.

2. A kit for packaging compound substances comprising a closed collapsible bag of a flexible material compatible with one ingredient of a compound substance, a measured quantity of that one ingredient sealed in the bag, a closed collapsible tube of a material compatible with another ingredient of the substance, a measured quantity of that other ingredient sealed in the tube, a generally solid tip closing said tube, said tip projecting sufficiently to be grasped by the fingers and adapted to be broken away upon manual flexing, the tube mounted with said tip projecting into said bag and so as to be engageable through the flexible collapsible walls thereof, said tube adapted upon the breaking away of said tip to be manually manipulated to express said other ingredient through said outlet and into said bag, trap means in said bag for said tip when broken away, said trap means having openings small enough to prevent escape of the tip therethrough and large enough for easy passage therethrough of said other ingredient expressed through said outlet and into said bag, a dispensing port tube outlet for said bag, said port tube outlet opening into said bag and adapted to receive rigid coupler means, and a membrane integrally closing said tube and constructed and arranged to be opened by said rigid coupler means upon its said reception in the tube.

3. A kit for packaging compound substances comprising a closed collapsible bag of a flexible material compatible with one ingredient of a compound substance, a measured quantity of that one ingredient sealed in the bag, a closed collapsible tube having an outlet and being of a material compatible with another ingredient of the substance, a measured quantity of that other ingredient sealed in the tube, a generally solid tip closing said tube outlet, said tip projecting sufficiently for grasping by the fingers and adapted to be broken away by manual flexing, the tube mounted with said outlet in closed communication with said bag and with said tip engageable through a flexible collapsible wall of said kit, said tube adapted upon the breaking away of said tip to be manually manipulated to express said other ingredient through said outlet and into said bag, said collapsible bag having a dispensing outlet, said dispensing outlet comprising a first port means for opening through a wall of the bag, said first port means normally closed but adapted to be opened for dispensing of said compound substance, and said collapsible bag having a second port means, said second port means comprising a tube opening into said bag for degassing, said degassing tube manipulable to close and seal said bag while evacuated.

References Cited by the Examiner

UNITED STATES PATENTS

| | | | |
|---|---|---|---|
| 1,270,969 | 7/1918 | Parker | 18—59 |
| 1,591,932 | 7/1926 | Young | 141—8 |
| 2,128,227 | 8/1938 | Bach | 141—66 |
| 2,414,525 | 1/1947 | Hill et al. | 18—59 |
| 2,415,409 | 2/1947 | Birkland | 141—8 |
| 2,477,273 | 7/1949 | Tognola | 19—59 |
| 2,528,530 | 11/1950 | Machleder | 206—47 |
| 2,606,704 | 8/1952 | Nichols | 141—66 |
| 2,702,034 | 2/1955 | Walter | 206—63.2 |
| 2,864,492 | 12/1958 | Lappala | 206—47 |
| 2,876,492 | 3/1959 | Frieder et al. | 18—5 |
| 2,893,061 | 7/1959 | Terry | 18—59 |
| 2,893,547 | 7/1959 | Earl et al. | 206—47 |
| 2,911,572 | 11/1959 | Francis et al. | |
| 3,076,230 | 2/1963 | Parker et al. | 18—36 |
| 3,084,390 | 4/1963 | Anderson | 18—36 |
| 3,087,491 | 4/1963 | Gewecke et al. | 206—63.2 |
| 3,087,606 | 4/1963 | Bollmeier et al. | 206—47 |

FOREIGN PATENTS 451,170   9/1948   Canada.

THERON E. CONDON, *Primary Examiner.*